United States Patent
Schmitz et al.

(10) Patent No.: US 8,117,469 B2
(45) Date of Patent: Feb. 14, 2012

(54) AUTOMATICALLY DETERMINING OPERATING PARAMETERS OF A POWER MANAGEMENT DEVICE

(75) Inventors: Michael J. Schmitz, Golden Valley, MN (US); Manish Dangol, Fargo, ND (US); Jonathan P. Kotta, Fargo, ND (US)

(73) Assignee: Packet Digital, Fargo, ND (US)

( * ) Notice: Subject to any disclaimer, the term of this patent is extended or adjusted under 35 U.S.C. 154(b) by 396 days.

(21) Appl. No.: 12/501,321

(22) Filed: Jul. 10, 2009

(65) Prior Publication Data

US 2011/0010567 A1 Jan. 13, 2011

(51) Int. Cl.
*G06F 1/00* (2006.01)
*G06F 1/26* (2006.01)
*G06F 1/32* (2006.01)
*G01R 19/00* (2006.01)
*G01D 18/00* (2006.01)
*G01P 21/00* (2006.01)

(52) U.S. Cl. ........ 713/300; 713/320; 713/322; 713/323; 702/64; 702/85; 702/108

(58) Field of Classification Search .................. None
See application file for complete search history.

(56) References Cited

U.S. PATENT DOCUMENTS

| | | | |
|---|---|---|---|
| 7,120,808 B2 * | 10/2006 | Miyairi et al. | 713/322 |
| 7,228,446 B2 | 6/2007 | Jorgenson et al. | |
| 7,237,128 B2 * | 6/2007 | Naveh et al. | 713/322 |
| 7,276,925 B2 * | 10/2007 | Dobberpuhl et al. | 324/750.3 |
| 7,312,646 B2 | 12/2007 | Jorgenson et al. | |
| 7,337,335 B2 | 2/2008 | Jorgenson et al. | |
| 7,363,176 B2 * | 4/2008 | Patel et al. | 702/64 |
| 7,539,880 B2 * | 5/2009 | Mentzer et al. | 713/300 |
| 7,882,369 B1 * | 2/2011 | Kelleher et al. | 713/300 |
| 2002/0084798 A1 * | 7/2002 | Osburn et al. | 324/765 |
| 2002/0087896 A1 * | 7/2002 | Cline et al. | 713/300 |
| 2005/0097191 A1 | 5/2005 | Yamaki et al. | |
| 2005/0143846 A1 | 6/2005 | Kocher et al. | |
| 2009/0158061 A1 | 6/2009 | Schmitz | |

OTHER PUBLICATIONS

PCT International Search Report and Written Opinion of the International Searching Authority for International Application No. PCT/US10/38696, mailed Aug. 6, 2010, 13 pages.
Atherton, James H. and Simmonds, H. Thomas, An Offset Reduction Technique for Use With CMOS Integrated Comparators and Amplifiers, IEEE Journal of Solid-State Circuits, vol. 27, No. 8, Aug. 1992, pp. 1168-1175.
Pastre, Marc, Methodology for the Digital Calibration of Analog Circuits and Systems—Application to a Hall Sensor Microsystem, Lausanne, EPFL 2005, 294 pages.

* cited by examiner

*Primary Examiner* — Ji H Bae
(74) *Attorney, Agent, or Firm* — Lowenstein Sandler PC (57) ABSTRACT

Automatically determining operating parameters of a power management device is described.

17 Claims, 7 Drawing Sheets

AUTOMATICALLY DETERMINING OPERATING PARAMETERS OF A POWER MANAGEMENT DEVICE

TECHNICAL FIELD

Embodiments of the present invention relate generally to power management and, in particular, to automatically determining operating parameters of a power management device.

BACKGROUND

As digital electronic processing systems trend toward higher operating frequencies and smaller device geometries, power management has become increasingly important to prevent thermal overload while maintaining system performance and prolonging battery life in portable systems.

The two principal sources of power dissipation in digital logic circuits are static power dissipation and dynamic power dissipation. Static power dissipation is dependent on temperature, device technology and processing variables and is composed primarily of leakage currents. Dynamic power dissipation is the predominant loss factor in digital circuitry and is proportional to the operating clock frequency, the square of the operating voltage and the capacitive load. Capacitive load is highly dependent on device technology and processing variables, so most approaches to dynamic power management focus on frequency and voltage control.

BRIEF DESCRIPTION OF THE DRAWINGS

Embodiments of the present invention are illustrated by way of example, and not by way of limitation, in the figures of the accompanying drawings.

DETAILED DESCRIPTION

Embodiments of automatically determining operating parameters of a power management device are described. The embodiments described herein are directed at minimizing the total energy consumption of a processing system (e.g., a host device and one or more peripheral devices) in which the power management device is employed. The embodiments described herein relate to a power management scheme that automatically tunes the operating parameters of one or more operating states of the power management device, such as voltage levels, current thresholds, timing for switching between states, and clock frequencies. The automatic tuning of these operating parameters allows the power management device to operate according to the automatically-tuned operating parameters, instead of default operating parameters or manually-programmed parameters. The embodiments described herein allow the operating parameters to be automatically tuned to optimize power management of the processing system, regardless of the specific devices used in the processing system.

The embodiments described herein may automatically tune the operating parameters by automatically determining operating parameters, in contrast to being manually set by a user. As such, the phrase "automatically determining" as used herein means that the operating parameters are determined without a user manually setting the operating parameters. The embodiments described herein may also automatically tune the operating parameters to be optimal operating parameters. The term "optimal" as used herein refers to the most favorable setting for a given operating parameter to minimize the total energy consumption of the processing system. For example, use of the optimal operating parameter by the power management device may not result in the best operating performance of the processing system, but may obtain better power management performance of the processing system, as compared to not using the optimal operating parameters. In one embodiment where the tunable operating parameter is an operating voltage, the optimal operating voltage may be the lowest possible voltage provided to a device (e.g., peripheral device) in an operating state that does not cause the device to stop operating (i.e., become non-responsive). In another embodiment where the tunable operating parameter is a current threshold for detecting when the power management device should transition from one operating state to another, the optimal current threshold may be set to be just above the highest current level expected to be drawn from the power management device in the particular operating state. The current threshold specifies the current draw of the device at which the power management device transitions to a higher power state. The optimal current threshold specifies this transition to happen only when the device can no longer operate at the lower power state and not transition otherwise, so that the power management device can stay in the lower power state as much as possible. By setting the current threshold to just above the highest current expected in the particular operating state, the power management device can accurately detect when to transition from one operating state to another, minimizing the number of false transitions. Similarly, other operating parameters may have optimal values that allow the power management of the processing system to be improved or optimized, such as timing for switching between states, clock frequencies, or the like.

Embodiments of the auto-tuning of the operating parameters may be performed when a processing system, in which the power management device operates, is powered up. Alternatively, embodiments of the auto-tuning may be performed when the processing system is built, or periodically throughout operation of the processing system.

In the following description, numerous details are set forth. It will be apparent, however, to one of ordinary skill in the art having the benefit of this disclosure, that the present embodiments may be practiced without these specific details. In some instances, well-known structures and devices are shown in block diagram form, rather than in detail, in order to avoid obscuring the present embodiments. References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
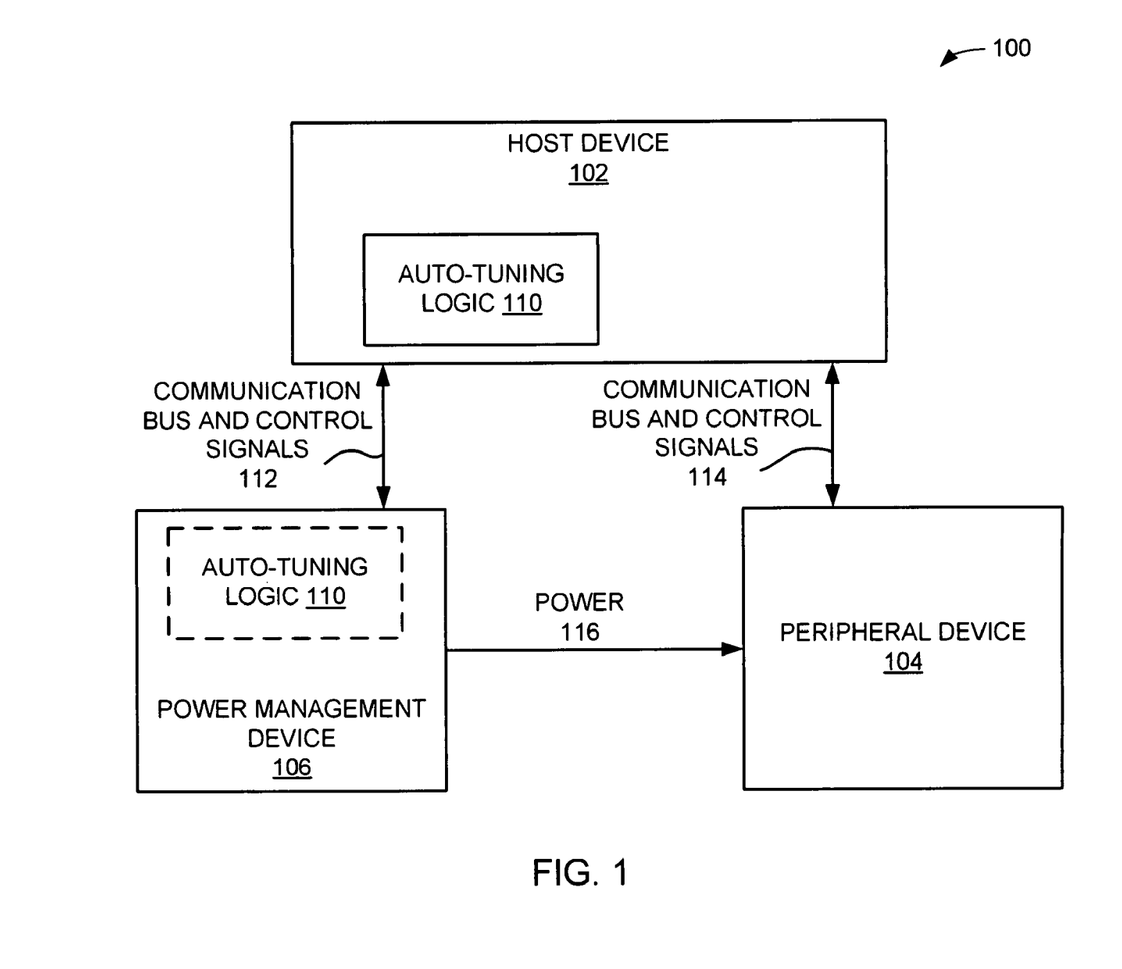
FIG. 1 is a block diagram of an exemplary processing system having auto-tuning logic according to one embodiment.

FIG. 1 is a block diagram of an exemplary processing system 100 having auto-tuning logic 110 according to one embodiment. The processing system 100 includes a host device 102, a peripheral device 104, and a power management device 106. The host device 102 may be a host computer (e.g., CPU) having one or more processors (e.g., microprocessors), a host controller, or other types of processing devices. The peripheral device 104 is a device coupled to the host device 102, and whose primary functionality is dependent upon the host device 102, and can therefore be considered as expanding the host device's capabilities, while not forming part of the host device's core architecture. The peripheral device 104 may be any type of device, component, circuit, subsystem or system capable of communicating with the host device 102 via communication bus and control signals 114. For example, the peripheral device 104 may be a single chip device such as a system on a chip, an ASIC, an FPGA, a memory chip or like device. In another embodiment, the peripheral device 104 is a multi-chip module including any combination of single chip devices on a common integrated circuit substrate. Alternatively, the peripheral device 104 may reside on one or more printed circuit boards, such as, for example, a mother board, a daughter board or other type of circuit card. The peripheral devices 104 may be on-chip integrated peripheral devices, such as an Ethernet device, a memory device, or the like. The peripheral device 104 may also be other types of I/O devices, for example, displays, keyboards, wireless communication channel devices, wired communication channel devices, user input devices, printers, scanners, disk drives (e.g., HDD or optical disc drives (ODD)), tape drives, microphones, speakers, cameras, or the like.

The power management device 106 is coupled to the host device 102 via communication bus and control signals 112 and to the peripheral device 104 via power lines 116. The power management device 106 provides power to the peripheral device 104 via the power lines 116. In another embodiment, the power management device 106 provides power to the peripheral device 104 and the host device 102. In one embodiment, the power management device 106 can monitor and modify control signals on the control lines between the host device 102 and the peripheral device 104 (not illustrated).

In one embodiment, the power management device 106 and the host device 102 reside on a common carrier substrate, such as an integrated circuit substrate. Alternatively, the power management device 106 and the host device 102 may reside on different substrates.

In one embodiment, the power management device 106 is an on-demand power (ODP) device that implements an ODP algorithm. Using the ODP algorithm, the ODP device monitors power usage across all devices in a processing system, and provides just enough power to the devices when needed. The ODP device can control clocks and supply voltages in real-time, and system-wide. In essence, the ODP device reduces the overall system power usage, instead of simply shutting devices off when they're not in use. It should be noted that although various embodiments presented herein are described in the context of an ODP device, in other embodiments, other power management devices may be used that do not have the added intelligence for on-demand power distribution. For example, the embodiments described herein may be used in a power management device that does not implement ODP management techniques, but implements other hardware or software power management techniques, such as voltage scaling, power gating, duty cycling, or clock frequency scaling. It should be noted that in some embodiments, the ODP device controls the power provided to a device (e.g., peripheral or host device), whereas, typical non-ODP power management schemes (e.g. dynamical voltage scaling (DVS), dynamic frequency scaling (DFS)) focus on the device lowering its power usage. Also, these non-ODP devices typically rely on a host device to tell them what to do, such as when to change voltage or clock frequency, whereas in an ODP device, a locally executed ODP algorithm is executed to determine when to change voltage and clock freq, etc. rather than waiting for a host device to tell the non-ODP device what to do to save power.

Using the ODP algorithm, the power management device 106 adjusts the operating voltage and/or clock frequency of the peripheral device 104 to minimize energy consumption of the processing system 100, depending on the operating state (also referred to as power states) of the peripheral device 104. The power management device 106 determines the operating state of the peripheral device 104 by monitoring the bus transactions between the host device 102 and the peripheral device 104 to determine the current processing demand and/or the current operating state of the peripheral device 104. If a particular bus transaction requires that the peripheral device 104 be in a different operating state, the power management device 106 can transition between one operating state and another, for example, by adjusting the operating voltage and/or clock frequency required for the new operating state. In one embodiment, the ODP device senses the current provided to the peripheral device 104 to determine whether the peripheral device 104 should be operated at a higher or lower operating state.

In one embodiment, the host device 102 includes auto-tuning logic 110. The auto-tuning logic 110 may be hardware, software, firmware, or any combination thereof. In one embodiment, the auto-tuning logic 110 is implemented in a system Basic Input/Output System (BIOS) of the host device 102. In another embodiment, the auto-tuning logic 110 is implemented in software of a boot disk that can be used to set the current thresholds and voltage levels for the peripheral device 104, such as, for example, a HDD or ODD. Alternatively, the auto-tuning logic 110 may be implemented in other ways in the host device 102 as would be appreciated by one of ordinary skill in the art having the benefit of this disclosure.

In another embodiment, the auto-tuning logic 110 is implemented in the power management device 106 (illustrated with hashed lines in power management device 106). The auto-tuning logic 110 may be implemented, for example, in the BIOS of the power management device 106, in a software routine or in a state machine of the power management device 106. Alternatively, the auto-tuning logic 110 may be implemented in both the host device 102 and the power management device 106; for example, the auto-tuning logic 110 of the power management device 106 may be hardware logic, whereas the auto tuning logic 110 of the host device 102 is a software driver.

Regardless of where the auto-tuning logic 110 resides, the auto-tuning logic 110 may command the power management device 106 and the peripheral device 104 to enter a learning mode to detect where the operating parameters of the power management device 106 should be set. In one embodiment, the auto-tuning logic 110 places the power management device 106 and the peripheral device 104 into pre-determined states, and performs one or more operations of a learning routine during the learning mode. By monitoring the operation of the peripheral device 104 while performing the operations of the learning routine, the auto-tuning logic 110 can automatically determine optimal operating parameters for the power management device 106, and program the power management device 106 accordingly. After the auto-tuning logic 110 programs the power management device 106, the power management device 106 operates using the optimal operating parameters during normal operation of the processing system (i.e., in a normal operating mode that is not the learning mode).

By running the learning routine of a predetermined series of events, and monitoring the activity, the auto-tuning logic 110 can calculate the operating parameters to optimize the power management of the peripheral device 104. For example, In one embodiment, the auto-tuning logic 110 can determine one or more of the following: 1) an optimal operating voltage for each of the operating states; 2) an optimal current threshold for current sensing by the power management device 106; 3) optimal timing for transitioning between the operating states; and 4) optimal clock frequency for each of the operating states. Alternatively, other operating parameters may be automatically determined and programmed into ODP algorithm in the power management device 106 as would be appreciated by one of ordinary skill in the art having the benefit of this disclosure.

One possible benefit of the embodiments described herein may be that the auto-tuning logic 110 can compensate for deviations between processing systems in which the auto-tuning logic 110 is employed. These deviations may be caused by manufacturing of the peripheral device 104, the host device 102, and/or the power management device 106. These deviations may also be caused by temperature, humidity, and operational life of mechanical components, for example, motors used in the peripheral device 104. The auto-tuning logic 110 may also be used to automatically determine optimized operating parameters after changes to the processing system have been made, for example, when different devices of the processing system have been added or replaced by different devices. For example, a user may replace the existing HDD with a new HDD, and, upon powering up the processing system, the auto-tuning logic 110 may be enabled to automatically determine the optimal operating parameters for the new HDD. The auto-tuning logic 110 allows the power management device 106 to be updated without the user being required to manually program the operating parameters, or having specific knowledge how to manually program the operating parameters of the power management device 106.

In some embodiments, the power management device 106 and/or the peripheral device 104 may include circuitry to assist the auto-tuning logic 110 through the learning routine, as described in more detail below. For example, the power management device 106 may include current sensing circuitry to sense the current provided to the peripheral device 104. The current sensing circuitry can be used by the auto-tuning logic 110 to determine a set point for current sensing (referred to herein as current threshold) during normal operation of the peripheral device 104. As an input to the ODP algorithm, the set point for current sensing should be set at specific points to indicate the state transitions between operating states. The auto-tuning logic 110 can be used in the learning mode to detect where the current thresholds should be set for each of the operating states. The goal is to find a threshold that accounts for all large current spikes of activity for which the ODP algorithm of the power management device 106 should go to a higher power mode, while minimizing the number of false transitions. For example, while using a boot disk for the learning mode, the auto-tuning logic software of the boot disk transitions the peripheral device 104 (e.g., HDD/ODD) to its highest current draw mode that is expected during the lowest power ODP state. By monitoring the activity of the peripheral device 104, the auto-tuning logic 110 can automatically determine the current threshold for the lowest power ODP state for current sensing by the power management device 106 during normal operation.

In another embodiment, the auto-tuning logic 110 can be used in the learning mode to determine a set point for voltage in each of the ODP states of the power management device 106. The power management device 106 provides the lowest voltage possible for each of the operating states. In one embodiment, the peripheral device 104 is set to the highest power mode correspond to the lowest operating state of the ODP algorithm. The auto-tuning logic 110 commands the power management device 106 to incrementally lower the voltage until the peripheral device 104 is non-responsive (i.e., stops operating). The auto-tuning logic 110 can then program the optimal voltage level to the power management device 106. This routine may be repeated for all operating states in the OPD algorithm.

It should be noted that although FIG. 1 illustrate one peripheral device 104, in other embodiments, the power management device 106 can be tuned to provide the lowest possible voltage for each operating state of multiple devices, as the operating voltages may differ for each device. Similarly, in other embodiments, the other operating parameters may be set for multiple peripheral devices.

Figure 2:
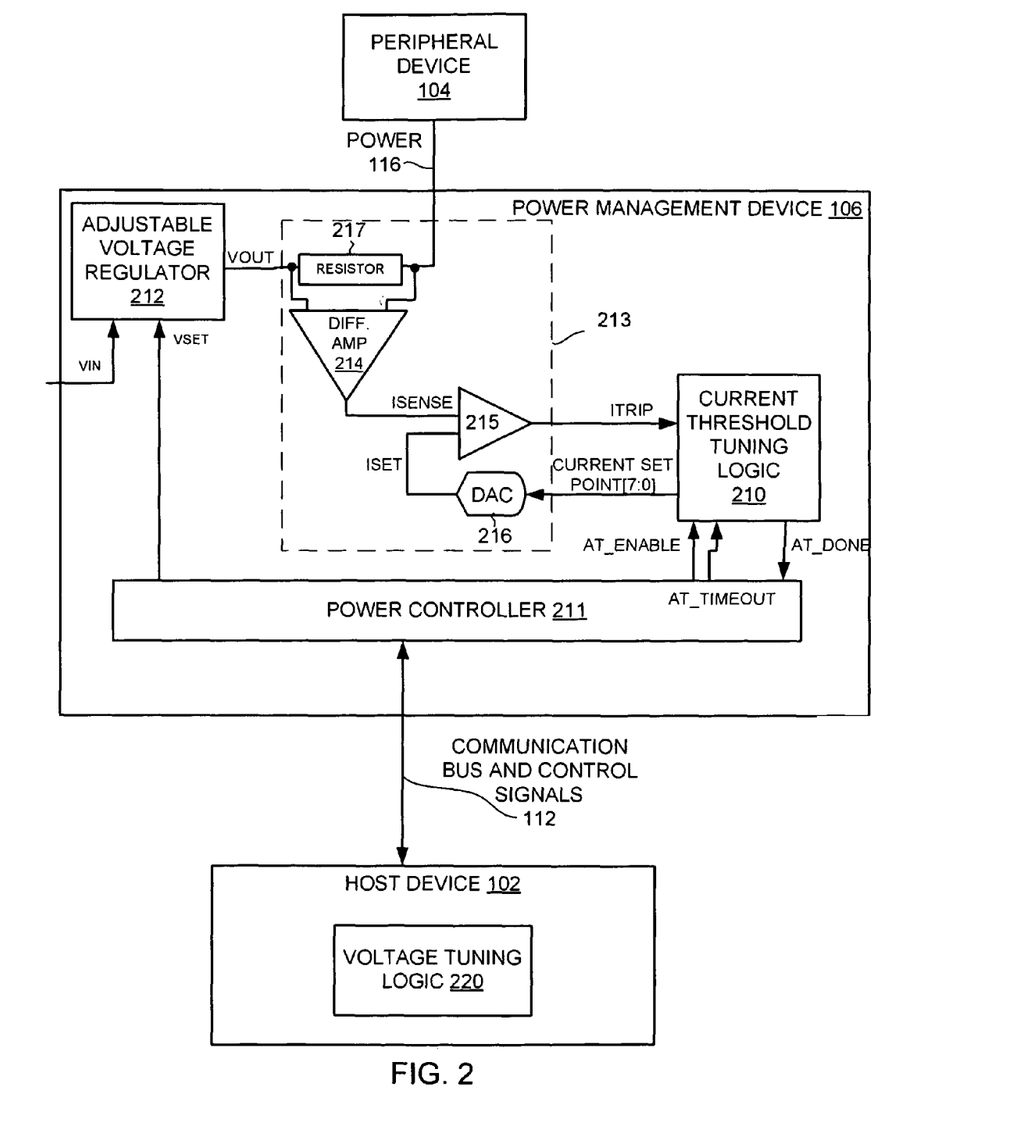
FIG. 2 is a block diagram of a processing system having current threshold tuning logic and voltage tuning logic according to one embodiment.

FIG. 2 is a block diagram of a processing system having current threshold tuning logic 210 and voltage tuning logic 220 according to one embodiment. In this embodiment, the power management device 106 includes the current threshold tuning logic 210, a power controller 211, an adjustable voltage regulator 212, and current sensing circuitry 213. The power controller 211 adjusts the operating voltage and/or clock frequency of the peripheral device 104 to minimize energy consumption, depending on the operating state of operation of the peripheral device 104. In one embodiment, the power controller 211 implements an ODP algorithm. In another embodiment, the power controller 211 is a state machine that adjusts the power provided to the peripheral device 104 on power lines 116. In one embodiment, the power controller 211 monitors the communication bus between the host device 102 and the peripheral device 104 to determine the operating state of the peripheral device 104 and transitions between the different states. In one embodiment, the power controller 211 uses the output (ITRIP) of the current sensing circuitry 213 to determine if the current draw of the peripheral device 104 is above or below the current threshold set by current set point (e.g., CURRENT_SETPOINT[7:0]). In normal ODP operation, the current set point (e.g., CURRENT_SETPOINT[7:0]) is adjusted by the power controller 211 as the operating states change. However, as shown in the FIG. 2, the current set point (e.g., CURRENT_SETPOINT[7:0]) is controlled by the auto-tuning logic (e.g., current threshold tuning logic 210) during auto-tuning mode.

The power controller 211 is coupled to the adjustable voltage regulator 212. The power controller 211 sends a control signal (VSET) to the adjustable voltage regulator 212 to set an output voltage (VOUT) provided to the peripheral device 104 at a specified voltage level. The voltage regulator 212 receives an input voltage (VIN) and provides an output voltage (VOUT) based on the control signal (VSET). In other embodiments, the power controller 211 can set the output voltage (VOUT) using other mechanisms as would be appreciated by one of ordinary skill in the art having the benefit of this disclosure, such as the use of digital-to-analog converter.

The current sensing circuitry 213 senses the current being provided to the peripheral device 104. The current threshold tuning logic 210 uses the output (ITRIP) of the current sensing circuitry 213 to determine the optimal current threshold for a given operating state. The current sensing circuitry 213 can receive input from the current threshold tuning logic 210 to set a current (ISET) corresponding to a current set point for comparison with the sensed current (ISENSE). The output of the current sensing circuitry 213 may indicate whether the current set point should be increased or set as the optimal current threshold. The current threshold tuning logic 210 is configured to determine a set point for the current sensing of the power management device 106. In one embodiment, the current threshold tuning logic 210 receives an enable signal (e.g., Auto-Tuning Enable (AT_ENABLE)), and a count value (e.g., Auto-Tuning Timeout (AT_TIMEOUT) from the power controller 211. In the embodiment shown in FIG. 4, the count value (AT_TIMEOUT) is used to set a timeout of a no-activity timer, which is described below with respect to the state diagram in FIG. 5. In one embodiment, the count value is an 8-bit value and no-activity timer period is the count value times the clock period (e.g., AT_TIMEOUT*CLK_PER*117647). Here, if the clock period (CLK_PER) of the clock signal (CLK) is 2 μs, then if the count value (AT_TIMEOUT) is set to 0x06, for example, then the no-activity timer expires after 12 μs. Similarly, if the count value (AT_TIMEOUT) is set to 0xFF, then the no-activity timer expires after 510 μs (255*200). In this way, the no-activity timer can be set by changing the count value (AT_TIMEOUT). The enable signal indicates when the current threshold tuning logic 210 is in the learning mode, and the count value may be used to specify the duration of the no-activity timer, which is described below. Upon completion of setting the current threshold, the current threshold tuning logic 210 can send a done signal (e.g., Auto-Tuning Done (AT_DONE)) back to the power controller 211.

In one embodiment, the current sensing circuitry 213 includes a differential amplifier 214 to sense the voltage across a resistor 217 to measure the current being provided to the peripheral device 104 while the host device 102 and peripheral device 104 are performing one or more operations (e.g., operations of a learning routine). In another embodiment, the current sensing circuitry 213 includes an operational transconductance amplifier (OTA) whose differential input voltage produces an output current. In either embodiment, the output of the differential amplifier 214 provides an indicator (ISENSE) of the current provided to the peripheral device 104. In another embodiment, the current sensing circuitry 213 may include a Hall Effect sensor. In this embodiment, the current sensing circuitry 213 would not include the sense resistor 217.

As described above, the power management device 106 and peripheral device 104 are placed in a learning mode, and the host device 102 may perform one or more operations of a learning routine to put the peripheral device 104 in its highest current draw mode that is expected for the given operating state. In one embodiment, an indicator of the current (ISENSE) provided to the peripheral device 104 is compared against a set current (ISET) corresponding to the current set point using a comparator 215. The set current (ISET) is generated from a digital-to-analog converter (DAC) 216, which receives the digital value (current set point) from the current threshold tuning logic 210. In one embodiment, the indicators ISENSE and ISET are currents that are compared. In another embodiment, the indicators ISENSE and ISET are voltages that are compared. Initially, the current set point can be set to a default value (e.g., zero). If the sensed current indicator (ISENSE) is higher than the set current indicator (ISET), the current threshold tuning logic 210 increases the current set point to a higher value than the default value, and compares the indicator (ISENSE) of the current provided to the peripheral device 104 and the set current indicator (ISET) corresponding to the increased current set point after a specified period of time. If the current (ISENSE) provided to the peripheral device 104 is not higher than the set current (ISET) after a second period of time, the current set point is set as the optimal current threshold for the particular operating state. In one embodiment, the current threshold tuning logic 210 measures the first specified period of time using a settling timer, which allows the time for the output of the comparator 215 to settle as its inputs change. In another embodiment, the current threshold tuning logic 210 measures the second specified period of time using a no-activity timer, which allows the current threshold tuning logic 210 to determine when no additional activity is being detected in order to end the routine to set the current threshold. Alternatively, other mechanisms may be used by the current threshold tuning logic 210 to determine whether the output of the current sensing circuitry 213 has settled and to determine when to end the routine when determining the current threshold. An example of the timing of the current threshold tuning logic 210 is described below with respect to FIG. 3.

In the depicted embodiment, the host device 102 includes the voltage tuning logic 220 to automatically determine a set point for voltage in each of the ODP states so that the power management device 106 provides the lowest possible voltage for each of the ODP states. These voltages may differ for each peripheral device coupled to the power management device 106. The voltage tuning logic 220 sets the peripheral device 104 to the highest power mode for the ODP state being tested. The voltage tuning logic 220 may send a control signal or command to the power controller 211 to set the output voltage (VOUT) of the adjustable voltage regulator 212. The voltage tuning logic 220 commands the power management device 106 to incrementally lower the voltage until the peripheral device 104 is non-responsive while performing the operations of the learning routine. The voltage tuning logic 220 can then set the optimal voltage of the power management device 106 based on the voltage level at which the peripheral device 104 is non-responsive, for example, by raising the operating voltage from the voltage level at which the peripheral device 104 stops operating by a minimal safe margin to be set as the optimal operating voltage. The voltage tuning logic 220 can program the power controller 211 with the optimal voltage for the particular operating state to be used in normal operation. This routine may be repeated for all ODP states in the OPD algorithm.

In the depicted embodiment, the current threshold tuning logic 210 and the voltage tuning logic 220 collectively make up the auto-tuning logic 110 of FIG. 1. In other embodiments, the auto-tuning logic 110 may include additional logic than the current threshold tuning logic 210 and the voltage tuning logic 220 to determine other operating parameters than the operating voltage and current threshold for each of the ODP states. For example, additional logic may be used to determine the appropriate timing for transitioning from one operating state to another operating state. In another example, the auto-tuning logic 110 includes additional logic to determine an optimal clock frequency for each of the ODP states by putting the power management device 106 and the peripheral device 104 in the learning mode, and performing one or more operations to determine the optimal clock frequency for the particular operating state. Although the current threshold tuning logic 210 and voltage tuning logic 220 reside on the power management device 106 and the host device 102, respectively, in other embodiments, the current threshold tuning logic 210 and the voltage tuning logic 220 can reside in the same device, such as both on the power management device 106, or both on the host device 102 as would be appreciated by one of ordinary skill in the art having the benefit of this disclosure. In the embodiment where the current threshold tuning logic 210 resides in the host device 102, the current sensing circuitry 213 may reside on the power management device 106 to sense the current provided to the peripheral device 104 and to compare the sensed current against the set current (ISET) corresponding to the current set point. Alternatively, other configurations are possible as would be appreciated by one of ordinary skill in the art having the benefit of this disclosure.

It should be noted that although illustrated as part of the current sensing circuitry 213, the comparator 214 and the DAC 216 may be integrated into the power controller logic 211, and the current threshold tuning 210 receives the output (ITRIP) from the power controller 211. Similarly, the current threshold tuning logic 210 may be integrated into the power controller 211. Alternatively, other configurations are possible.

Figure 3:
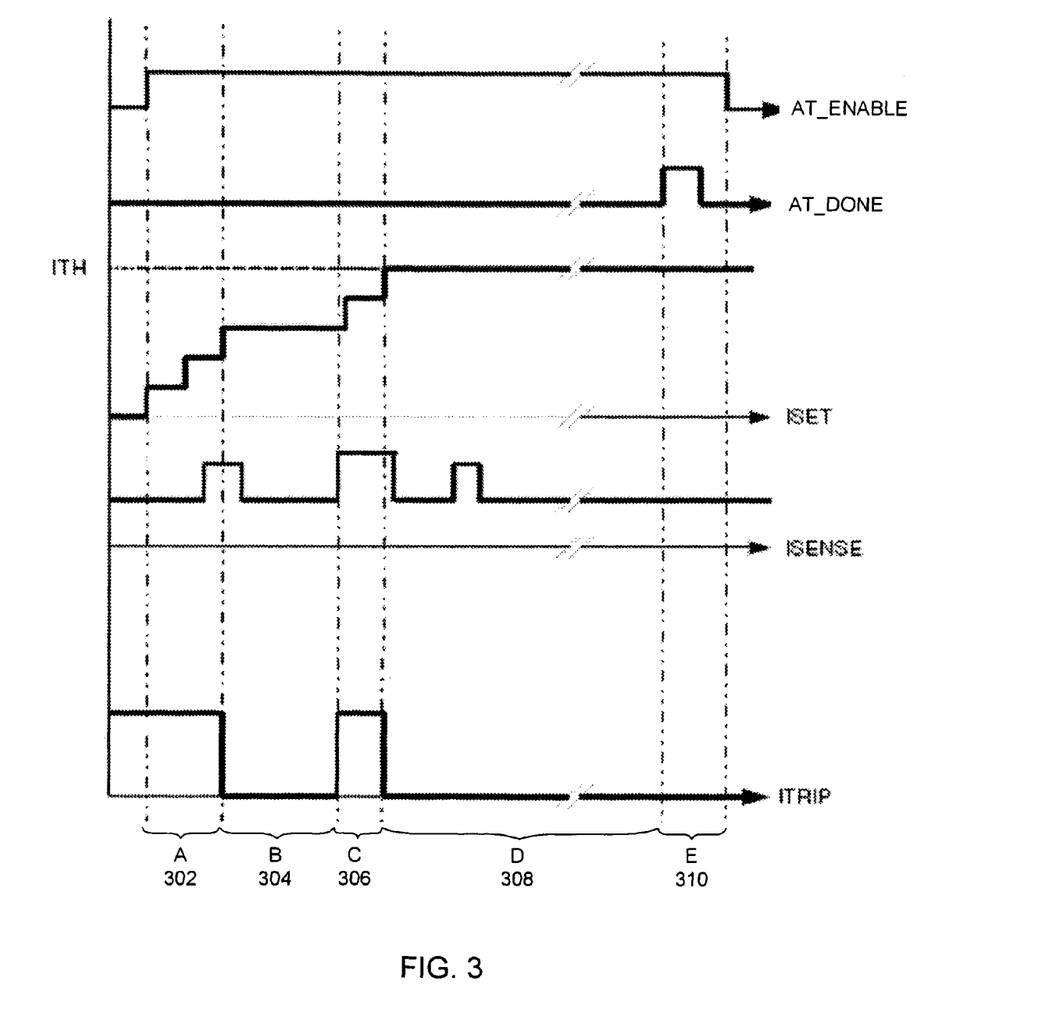
FIG. 3 is a timing diagram of the current threshold logic of FIG. 2.

FIG. 3 is a timing diagram of the current threshold logic of FIG. 2. As described above, the current threshold tuning logic 210 sets the current set point to a default value, for example, zero. During time A 302, the set current (ISET) corresponding to the current set point is less than sensed current (ISENSE), so the set current (ISET) corresponding to the current set point is incremented by a unit step size. At time B 304, the set current (ISET) is more than the sensed current (ISENSE), so the set current (ISET) remains the same. However, at time C 306, there is a current spike that is higher than the set current (ISET). As such, the set current (ISET) is incremented by the unit step size. At time D 308, the set current (ISET) remains higher than the sensed current (ISENSE) until the no-activity timer expires, indicating no activity. At time E 310, the current threshold tuning logic 210 sets the set current (ISET) as the optimal current threshold for the particular state, and indicates that the auto-tuning of the current threshold is done (e.g., asserts AT_DONE). After the host device 102 reads the AT_DONE indicator, the host device 102 disables the current threshold tuning logic 210.

Figure 4:
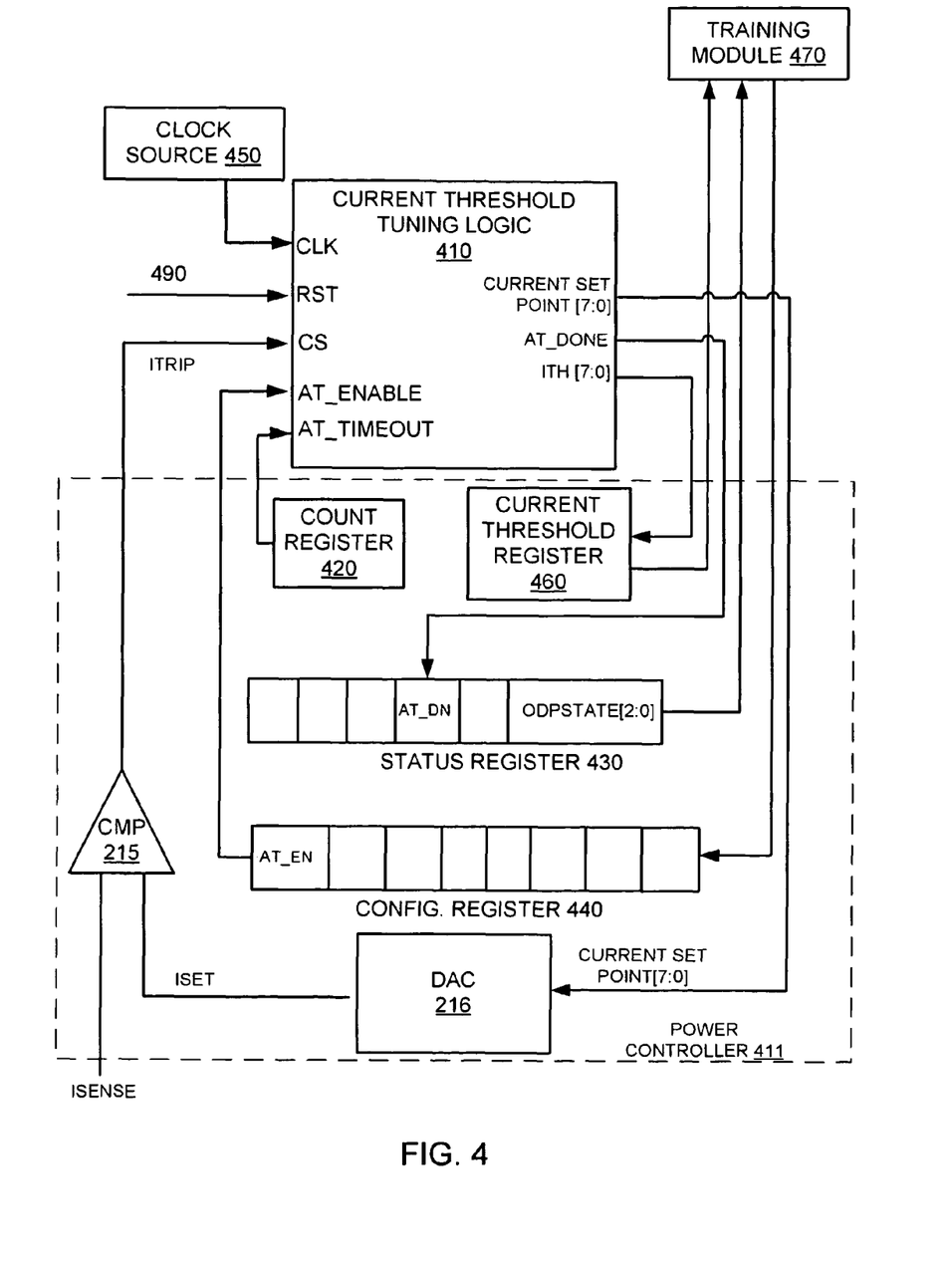
FIG. 4 is a block diagram of the current threshold tuning logic and power controller according to another embodiment.

FIG. 4 is a block diagram of the current threshold tuning logic 410 and the power controller 411 according to another embodiment. The current threshold tuning logic 410 receives various inputs from the power controller 411 and provides various outputs to the power controller 411. The inputs to the current threshold tuning logic 410 include a clock signal (e.g., CLK), an enable signal (e.g., AT_ENABLE) from a configuration register 440, a count value (e.g., AT_TIMEOUT) from the count register 420, an output (CS) from the current sensing circuitry 213, and a reset signal 490 (e.g., RST). It should be noted that although the depicted embodiment illustrates the current threshold tuning 410 as receiving the clock signal from an external clock source 450, such as, for example, from the host device 102, in another embodiments, the clock signal is received from a clock source in the power controller 411. In other embodiments, the clock signal could be generated internally by the current threshold tuning logic 410. In other embodiments, instead of using a clock signal, the current threshold timing could be done with an analog timer, such as a 555 timer. In another embodiment, the current threshold tuning logic 410 uses the clock signal to clock the DAC 216 when enabled. The current threshold tuning logic 410 uses the count value to set the no-activity timer for detecting when the current threshold tuning logic 410 finishes the learning routine. The output (CS) corresponds to the output (ITRIP) of the comparator 215, which compares the sensed current (ISENSE) and the set current (ISET) corresponding to the current set point from the DAC 216, as described above with respect to FIG. 2. When the current threshold tuning logic 410 receives the reset signal 490, the current threshold tuning logic 410 is reset. Upon receiving the reset signal 490, the current threshold tuning logic 410 resets the output, including the current set point 410 to the reset values.

The outputs from the current threshold tuning logic 410 include a current set point that is provided to the DAC 216, a current threshold value that is provided to a current threshold register 460 when the optimal current threshold is found, and a completion signal (e.g., AT_DONE) to be provided to a status register 430 when the current threshold tuning logic 410 finishes the learning routine.

In one embodiment, a training module 470 interacts with the current threshold tuning logic 410 by way of the status register 430 and the configuration register 440 of power controller 411. The training module 470 writes and reads to registers 420, 430, and 440 to control the current threshold tuning 410 in the power management device 106. The training module 470 may be a software module that operates on the host device 202, such as in the boot disk of the host device 202. In one embodiment, the training module 470 is a driver operating in connection with the operating system of the host device 202 that transitions the power management device 106 and the peripheral device 104 into the learning mode and performs one or more operations to automatically determine the operating parameters for one or more operating states. In another embodiment, the training module 470 may be part of the power management device 106. In one embodiment, the training module 470 is part of the auto-tuning logic 110 of the host device 102. Alternatively, the training module 470 may be part of the auto-tuning logic 110 of the power management device 106.

In one embodiment, the current threshold tuning logic 410 includes a state machine that steps through the following states as follows:
1) CURRENT SET POINT [7:0] is set to 8'h00 and go to step 2.
2) Increment the CURRENT SET POINT by 8'h01 and go to step 3.
3) Wait for (255*CLK) and go to step 4.
4) If CS=0 for (AT_TIMEOUT*117647) clock cycles, set the ITH to CURRENT SET POINT, else go to step 2.
4) Then AT_DONE is asserted, which sets the AT_DONE bit in the status register 430.

In one embodiment, a driver (e.g., operating in the software of the host device 202), which controls the current threshold logic 410 continuously reads the status register 430. When the value for the AT_DN value of the status register 430 is set, the driver uses the current threshold stored in the current threshold register 460 as the optimal current threshold for the particular operating state. In another embodiment, the same driver can change the operating voltage, and reiterate the current threshold detection described above to find the current threshold for different voltage levels, since the current threshold is dependent on the operating voltage.

In the embodiment above, the settling timer is set as 255 times the clock signal to allow some time for the output of the comparator 215 to settle as its inputs change. In other embodiments, the settling timer may be set at other values. It should be noted that the settling timer provides a small delay so that the DAC 216 and comparator 215 have time to change before resuming the procedure; however, if the DAC 216 and comparator 215 are fast enough, there is no need for the settling timer. It should also be noted that the procedure not be run too fast that the analog components can't follow. In another embodiment, a register may be used to set a scalar value (e.g., 255) for the settling timer. Also, in the embodiment above, the no-activity timer is set as a specified number of clock cycles (AT_TIMEOUT*117647). In another embodiment, the timeout value may be directly set. In other embodiments, the no-activity timer may be set to other values. The duration of the no-activity timer is equal to CLK*117647*AT_TIMEOUT. Thus, the length of the no-activity timer can be adjusted by writing a different value to the AT_TIMEOUT register 420. This value may be used to change the units of AT_TIMEOUT from the clock periods to some fraction of a minute. In one embodiment, AT_TIMEOUT is 8-bit value and clock cycle period is 2 μs. In order to have a range from 0 to 1 minute for the no-activity timer, the AT_TIMEOUT value is scaled with 117647. In this embodiment, a counter that is incremented in each clock cycle is compared to the value (AT_TIMEOUT*117647) of the no-activity counter. For example, if the AT_TIMEOUT is set to 0xff then the no-activity timer expires after 60 seconds (255*11764*2 μs=60 s). In another embodiment, another register may be used to set a scalar value (e.g., 117647) for the no-activity timer.

The operations of the state diagram and flow diagram of FIGS. 5 and 6 will be described with reference to the exemplary embodiment of FIGS. 2 and 4. However, it should be understood that the operations of the state diagrams and flow diagrams can be performed by embodiments of the invention other than those discussed with reference to FIGS. 2 and 4, and the embodiments discussed with reference to FIGS. 2 and 4 can perform operations different than those discussed with reference to the state and flow diagrams.

Figure 5:
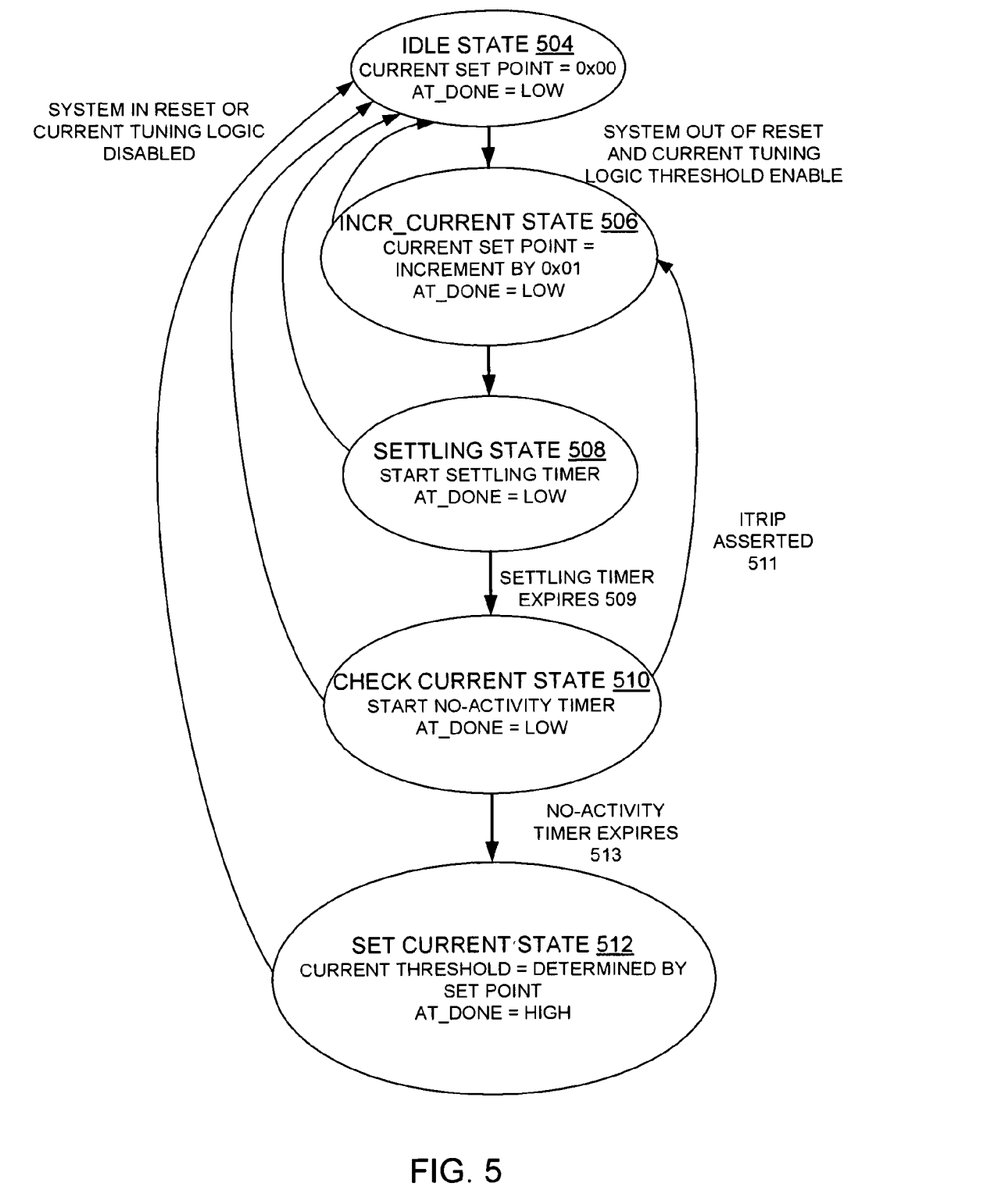
FIG. 5 is a state diagram of the current threshold tuning logic of FIG. 4 according to one embodiment.

FIG. 5 is a state diagram of the current threshold tuning logic of FIG. 4 according to one embodiment. In one embodiment, the state machine of the power management device 106 transitions between the states of the state diagram to automatically determine the current threshold for a particular state. In another embodiment, a state machine of the current threshold tuning 410 (or 210) transitions between the states of the state diagram to automatically determine the current threshold for a particular operating state.

The state diagram starts by transitioning from any state, in which the processing system is in reset and/or the current threshold tuning logic 410 is disabled, to an idle state 504. In idle state 504, the state machine set the current set point to zero (e.g., Current set point=0x00), and sets or maintains the completion signal as de-asserted (e.g., AT_DONE=low), indicating that the current threshold tuning logic 410 is not complete. When the processing system is out of reset and the current threshold tuning logic 410 is enabled (e.g., AT_ENABLE is asserted), the state machine transitions to an increment current state 506, incrementing the current set point by a unit step size (e.g., current set point=previous set point+ 1x01), and maintaining the completion signal as de-asserted. The state machine transitions to a settling state 508, in which the state machine starts the settling timer, and maintains the completion signal as de-asserted. When the settling timer expires 509, the state machine transitions to the next state 510 to check the current, in which the state machine determines if the output signal of the comparator (ITRIP) is asserted, and starts a no-activity timer. The output signal of the comparator is asserted when the current sensed (ISENSE) is greater than the set current (ISET) corresponding to the current set point. In state 510, the state machine maintains the completion signal as de-asserted. If the output signal (ITRIP) is asserted 511, the state machine returns to the increment current state 506. If at state 510, the output signal (ITRIP) is not asserted and the no-activity timer expires 513, the state machine transitions to a set current state 512, in which the state machine sets the current set point as the optimal current threshold (e.g., stored in current threshold register 460). Also, in state 512, the state machine asserts the completion signal (e.g., AT_DONE=high). In one embodiment, the state machine stays in the state 512 until the system is in reset or the current tuning logic 410 is disabled. In another embodiment, the state machine returns to the idle state 504 after completion of the auto-tuning process. In one exemplary embodiment, the state machine sets the AT_DN value (e.g., bit) in the status register 420, which the driver auto-tuning logic 110 in the host device 102 is reading continuously. After seeing this bit set, the driver auto-tuning logic 110 in the host device 102 disables the current threshold tuning logic 210 by writing an AT_ENABLE bit to 0 in the configuration register 440, which makes the state machine go the idle state 504 from the set current state 512. Alternatively, the state machine may transition to the idle state 504 using other mechanisms as would be appreciated by one of ordinary skill in the art having the benefit of this disclosure.

Figure 6:
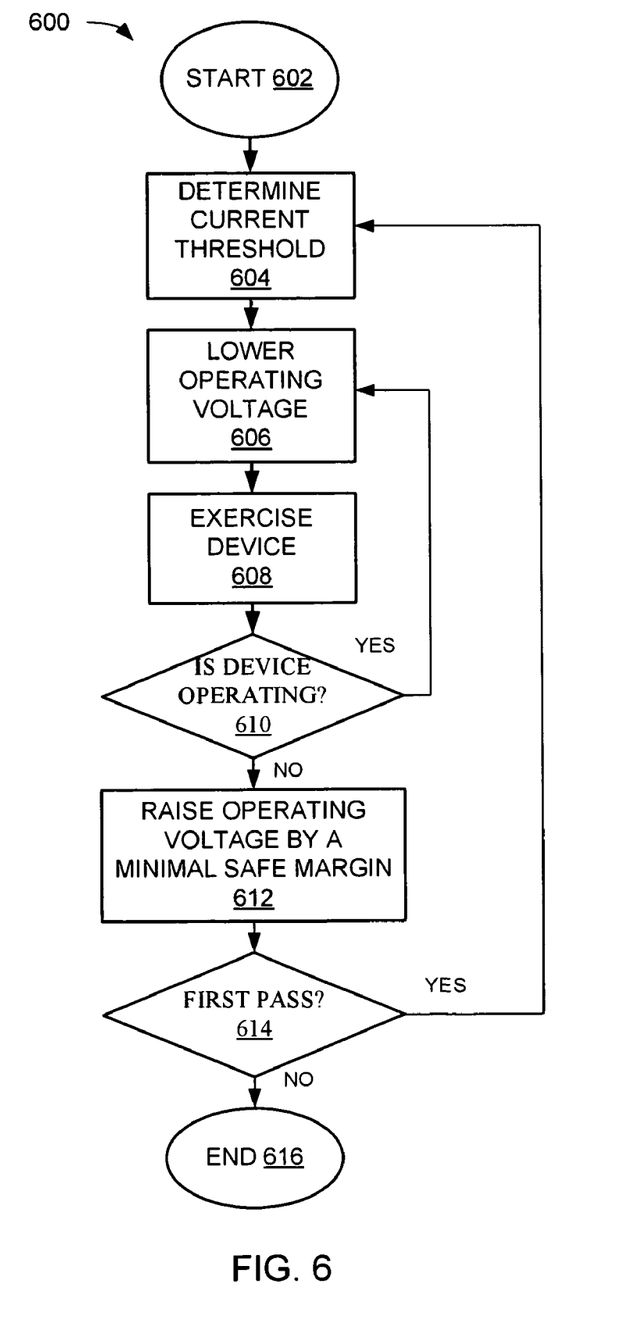
FIG. 6 is a flow diagram of a method of automatically determining an optimal operating voltage according to one embodiment.

FIG. 6 is a flow diagram of a method 600 of automatically determining an optimal operating voltage according to one embodiment. The method 600 is performed by processing logic that may comprise hardware (circuitry, dedicated logic, etc.), software (such as is run on a general purpose computer system or a dedicated machine), firmware (embedded software), or any combination thereof. In one embodiment, the method 600 is performed by the auto-tuning logic 110 of FIG. 1. In another embodiment, the method 600 is performed by the voltage tuning logic 220 of FIG. 2 and the current threshold tuning logic 210 of FIG. 2 or the current threshold tuning logic 410 of FIG. 4.

Referring to FIG. 6, processing logic starts the auto-tuning operations (block 602) by determining the current threshold (block 604) as described herein. At block 606, processing logic lowers an operating voltage of the particular operating state (block 606), and exercises the peripheral device 104 (block 608). In one embodiment, the processing logic incrementally lowers the first operating voltage according to a unit step size. In one embodiment, the host device 102 performs one or more operations while the peripheral device 104 operates at the first operating voltage to exercise the peripheral device 104. For example, the host device 102 may perform spin-up operations and read operations on the HDDs and the ODDs. The goal of the exercises is to put the peripheral device 102 in a high current draw mode to determine that the thresholds are sensitive enough and that the operating voltages are high enough. At block 610, processing logic determines if the peripheral device 104 has stopped operating, such as by determining if the peripheral device 104 is non-responsive. In one embodiment, the processing logic determines if the peripheral device 104 is operational by reading error messages from an operation system running on the host device 102. In another embodiment, the processing logic determines if the peripheral device 104 is operational by receiving a signal from the peripheral device 104 that indicates that the power level is good. In another embodiment, the processing logic can communicate with the peripheral device's driver in the OS to determine if the drive is non-responsive, such as if the peripheral device disappears (not active). If the peripheral device 104 is still operating, the processing logic returns to block 606 to lower the operating voltage according to the unit step size. Once the processing logic determines that the peripheral device 104 is not operating, the processing logic raises the operating voltage from the voltage level at which the peripheral device 104 stops operating by a minimal safe margin (block 612) to be set as the optimal operating voltage. In another embodiment, the processing logic sets the optimal operating voltage to be the voltage level of the increment before the voltage level at which the peripheral device 104 stopped operating. At block 614, the processing logic determines whether this is the first pass through the method 400. If it is the first pass, the processing logic returns to block 604 to determine the current threshold for the optimal operating voltage, repeating the procedure again to ensure the optimal current threshold is set for the optimal operating voltage, since the optimal current threshold is dependent upon the voltage. In another embodiment, some of the operations of the procedure are not repeated in the second pass. For example, in one embodiment, in the second pass, the method determines the current threshold (block 604) for the optimal operating voltage, but does not perform the operations of blocks 606-612. If at block 614, it is determined that it is not the first pass, the method ends (block 616).

In one embodiment, the method 600 is repeated for each operating state (e.g., ODP states) of the power management device 106. In one embodiment, the method 600 is performed for each of the operating states from the highest power state to the lowest power state. Alternatively, the method 600 may be performed in other sequences.

As noted above, the embodiments described herein may be used to automatically determine other operating parameters than operating voltage and current thresholds, such as for example, clock frequencies and timing for transitioning between states. In one embodiment, optimal clock frequency could be determined by testing different clock frequencies, measuring how long it takes the peripheral to complete some clock frequency dependent task at each tested clock frequency, and determining which clock frequency results in the task being completed in a time that results in the optimal energy savings. Alternatively, other methods could be used to determine clock frequencies for one or more of the operating states of the power management device. Optimal clock frequency means running a device (e.g. CPU) at the minimal clock rate that it needs to complete its tasks on time, if this means less power. In principle, there is no lower limit on the clock frequency as long as the device can complete its tasks on time, though real devices may have limits. Another option is to run the device at a high clock speed and then put it in a very low power state in which it does no work. Clearly, these two techniques can be blended to reach an optimal power management system. In one embodiment, the method of determining the clock frequency is similar to the method of determining the operating voltage, but instead of determining if the device is still operational, it is determined if the device is operating fast enough. It should be noted that lowering the frequency may be worthwhile if it's better than putting the peripheral device in a very low power, non-operational state.

The timing for transitioning between states refers to a minimum delay required between state transitions. In some embodiments, the timing between states may be controlled by timeouts, which is the amount of time the power management device waits before switching from one state to another, for example, switching to a lower power state. If multiple state transitions occur too quickly, the energy saved by operating in the optimal states may be less than the energy used to perform the state transitions. The optimal timeout means that the timeout is as short as possible, as this means that the power management device spends less time in the higher power states. The main reason for long timeouts is increased reliability. The operating state of the peripheral device (e.g., a hard drive) is not necessarily known exactly by the power management device. Longer timeouts mean less chance of assuming the peripheral device is in a low power state when it is actually not. There is also some cost associated with changing power states, so it is good to minimize the number of unnecessary transitions, and picking good timeouts is one part of this. In one embodiment, a Lower Envelope Algorithm (LEA) is used in determining optimal transition timing, such as described in U.S. Patent Application Publication No. 2009/0158061, filed Mar. 28, 2008, which has been assigned to the same assignee as the present application. For example, automatically determining the optimal timing could be done using something like the LEA algorithm along with measuring the energy consumed in different operating states and the energy consumed in transitioning between different optimal states. In another embodiment, the optimal timing is determined based on observations of several drives, operating systems, and exercises. In another embodiment, the optimal timing is determined based on guaranteed times from an OS driver. In another embodiment, the timeouts are automatically determined based on past usage.

Embodiments of the present invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Figure 7:
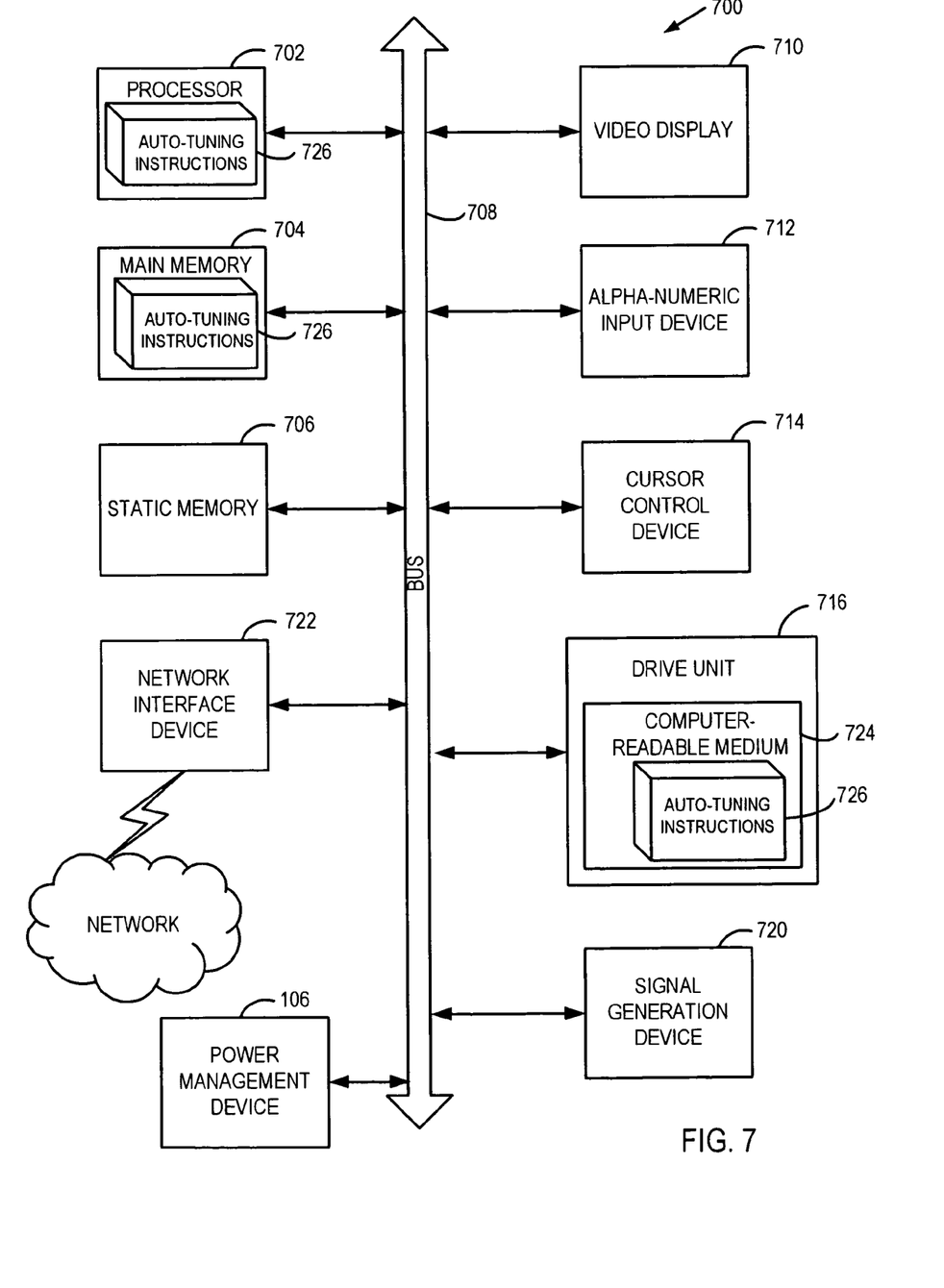
FIG. 7 illustrates a diagrammatic representation of a machine in the exemplary form of a processing device within which a set of instructions, for causing the machine to perform any one or more of the methodologies discussed herein, may be executed.

FIG. 7 illustrates a diagrammatic representation of a machine in the exemplary form of a processing device 700 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as auto-tuning instructions of the learning routine as described herein.

In one embodiment, the processing device 700 is the host device 102 that implements the auto-tuning logic 110. In another embodiment, the processing device 700 is the power management device 106 that implements the auto-tuning logic 110. As described above, in other embodiments, the auto-tuning logic 110 may be implemented in both the host device 102 and the power management device 106. For ease of description and illustration and not limitation, the depicted embodiment illustrates the embodiment of the host device 102 that implements auto-tuning instructions of the learning routine to automatically determine the operating parameters of the power management device 106.

The exemplary processing device 700 includes a processor 702, a main memory 704 (e.g., read-only memory (ROM), flash memory, dynamic random access memory (DRAM) such as synchronous DRAM (SDRAM) or DRAM (RDRAM), etc.), a static memory 706 (e.g., flash memory, static random access memory (SRAM), etc.), and a data storage device 716, and the power management device 106, which may communicate with each other via a bus 730. In one embodiment, the power management device 106 resides in the processing device 700. Alternatively, the power management device 106 resides outside the processing device 700.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, hybrid architecture, or a processor implementing other instruction sets or processors implementing a combination of instruction sets, including the auto-tuning instructions. The processor 702 may also be one or more special-purpose processing devices such as an application specific integrated circuit (ASIC), a field programmable gate array (FPGA), a digital signal processor (DSP), network processor, or the like. The processor 702 is configured to execute the processing logic 726 for performing the operations and steps discussed herein, including operations and steps of the learning routine to automatically tune the operating parameters of the power management device 106, as described above with respect to FIGS. 5 and 6. Furthermore, the processor 702 could be implemented on one or more chips. The bus 708 represents one or more buses and bridges. While this embodiment is described in relation to a single processor processing device, other embodiments may include a multi-processor processing device.

The processing device 700 may further include a network interface device 722. The processing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The data storage device 716 may include a computer-readable storage medium 724 on which is stored one or more sets of instructions, including the auto-tuning instructions (e.g., software 726) embodying any one or more of the methodologies or functions described herein. The software 726 may also reside, completely or at least partially, within the main memory 704 and/or within the processor 702 during execution thereof by the processing device 700, the main memory 704 and the processor 702 also constituting computer-readable storage media. The software 726 may further be transmitted or received over a network via the network interface device 722.

While the computer-readable storage medium 724 is shown in an exemplary embodiment to be a single medium, the term "computer-readable storage medium" should be taken to include a single medium or multiple media (e.g., a centralized or distributed database, and/or associated caches and servers) that store the one or more sets of instructions, including the auto-tuning instructions. The term "computer-readable medium" shall also be taken to include any medium that is capable of storing, encoding or carrying a set of instructions for execution by the machine and that cause the machine to perform any one or more of the methodologies of the auto-tuning embodiments. The term "computer-readable storage medium" shall accordingly be taken to include, but not be limited to, solid-state memories, optical media, magnetic media, and other mediums for storing a set of instructions for execution by the machine and that cause the machine to perform any one or more of the methodologies of the auto-tuning embodiments.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing", "computing", "calculating", "determining", "displaying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A computer-implemented method, comprising:
providing a power management device to control power provided to a peripheral device, coupled to a host device, according to a plurality of operating states of the power management device; and
automatically determining, by auto-tuning logic, an operating parameter for at least one of the operating states of the power management device, wherein the operating parameter is an optimal current threshold for current sensing by the power management device in the at least one operating state, and wherein the optimal current threshold is the highest current level expected to be drawn from the power management device in the at least one operating state, and wherein said automatically determining the optimal current threshold comprises:
transitioning the power management device to operate in a first of the plurality of operating states;
setting a current set point to a default value;
while the power management device is in the first operating state, performing one or more operations between the host device and the peripheral device to operate the peripheral device in its highest current draw mode that is expected in the first operating state of the power management device;

measuring the current provided to the peripheral device while performing the one or more operations;

comparing the current and a set current corresponding to the current set point;

if the current provided to the peripheral device is higher than the set current:

increasing the current set point to a higher value than the default value; and comparing the measured current provided to the peripheral device and a set current corresponding to the increased current set point; and if the current provided to the peripheral device is not higher than the set current, setting the current set point as the optimal current threshold.

2. The method of claim 1, wherein said comparing of the measured current is performed after a first specified period of time of a settling timer, and wherein said setting the current set point as the optimal current threshold is performed if the current provided to the peripheral device is not higher than the set current after a second period of time of a no-activity timer.

3. A computer-implemented method, comprising:

providing a power management device to control power provided to a peripheral device, coupled to a host device, according to a plurality of operating states of the power management device; and automatically determining, by auto-tuning logic, an operating parameter for at least one of the operating states of the power management device, wherein said automatically determining the optimal operating voltage comprises:

transitioning the power management device to operate in a first of the plurality of operating states;

lowering a first operating voltage provided to the peripheral device in the first operating state to detect at what voltage level the peripheral device stops operating;

setting the optimal operating voltage of the first operating state based on the voltage level at which the peripheral device stops operating; and determining an optimal current threshold for the optimal operating voltage of the first operating state, wherein the optimal current threshold is the highest current level expected to be drawn from the power management device in the first operating state, wherein determining the optimal current threshold for the second operating state comprises:

setting a current set point to a default value;

while the power management device is in the second operating state, performing one or more operations between the host device and the peripheral device to operate the peripheral device in its highest current draw mode that is expected in the second operating state of the power management device;

measuring the current provided to the peripheral device while performing the one or more operations;

comparing the current and a set current correspond to the current set point;

if the current provided to the peripheral device is higher than the set current:

increasing the current set point to a higher value than the default value; and comparing the current provided to the peripheral device and the set current corresponding to the increased set point; and if the current provided to the peripheral device is not higher than the set current, setting the current set point as the optimal current threshold.

4. A computer-implemented method of auto-tuning optimal operating parameters of a power management device coupled to a host device and a peripheral device, comprising:

placing the power management device in a learning mode;

performing a plurality of operations between the host device and the peripheral device during the learning mode; and automatically determining, by auto-tuning logic, a plurality of optimal operating parameters for a plurality of operating states of the power management device based the plurality of operations, wherein the plurality of optimal operating parameters comprise an optimal current threshold for current sensing by the power management device in each of the plurality of operating states and an optimal operating voltage for each of the plurality of operating states, wherein the optimal current threshold is the highest current level expected to be drawn from the power management device in the corresponding operating state, wherein the optimal operating voltage is the lowest possible voltage provided to the peripheral device in the corresponding operating state that does not cause the peripheral device to stop operating, and wherein said automatically determining the plurality of optimal operating parameters comprises:

for each of the plurality of operating states of the power management device:

determining a first optimal current threshold for a current operating voltage provided to the peripheral device in the corresponding operating state;

lowering the current operating voltage provided to the peripheral device in the corresponding operating state to detect at what voltage level the peripheral device stops operating;

setting the optimal operating voltage of the first operating state based on the voltage level at which the peripheral device stops operating; and determining a second optimal current threshold for the optimal operating voltage wherein the plurality of optimal operating parameters comprises the optimal operating voltage and the second optimal current threshold.

5. The method of claim 4, wherein the method is performed at power-up of the host device.

6. The method of claim 4, wherein the method is performed periodically during operation of the host device.

7. An apparatus, comprising:

auto-tuning logic to place a power management device in a learning mode, wherein the power management device provides power to a peripheral device according to an operating state of the power management device; and processing logic to perform a plurality of operations between a host device and the peripheral device during the learning mode, wherein the auto-tuning logic is configured to automatically determine an operating parameter for the operating state, wherein the power management device comprises:

an adjustable voltage regulator to provide power to the peripheral device; and a current sensing circuit to sense the current provided to the peripheral device during the learning mode; and a comparator to compare the sensed current provided to the peripheral device and a set current corresponding to a current set point of the current threshold and to provide an output to the current threshold tuning logic to indicate whether the current set point should be increased or set as the optimal current threshold, wherein the operating parameter is an optimal current threshold for current sensing by the current sensing circuit, wherein the optimal current threshold is the highest current level expected to be drawn from the power management device in the operating state, and wherein the auto-tuning logic comprises current threshold tuning logic to determine the optimal current threshold based on the sensed current provided to the peripheral device.

8. The apparatus of claim 7, wherein the auto-tuning logic is configured to determine the operating parameter without a user manually setting the operating parameter.

9. The apparatus of claim 7, wherein the auto-tuning logic resides in the host device.

10. The apparatus of claim 7, wherein the auto-tuning logic resides in the power management device.

11. The apparatus of claim 7, wherein the auto-tuning logic is configured to program the power management device to operate according to the operating parameter when in a normal operating mode.

12. The apparatus of claim 7, further comprising:
a current threshold register to store the optimal current threshold;
a status register to indicate when the current threshold tuning logic has set the optimal current threshold in the current threshold register; and
a configuration register to indicate when the current threshold tuning logic is enabled.

13. The apparatus of claim 7, wherein the plurality of optimal operating parameters comprises optimal timing for transitioning between at least two of the plurality of operating states of the power management device.

14. The apparatus of claim 7, wherein the plurality of optimal operating parameters comprises an optimal clock frequency for each of the plurality of the plurality of operating states of the power management device.

15. A computer readable storage medium that provides instructions, which when executed on a processing device, cause the processing device to perform a method comprising:
placing a power management device in a learning mode, wherein the power management device provides power to a peripheral device according to an operating state of the power management device;
performing a plurality of operations between the processing device and the peripheral device during the learning mode; and
automatically determining a plurality of optimal operating parameters for the operating state of the power management device based on the plurality of operations, wherein the plurality of optimal operating parameters comprise an optimal current threshold for current sensing by the power management device in each of the plurality of operating states and an optimal operating voltage for each of the plurality of operating states, wherein the optimal current threshold is the highest current level expected to be drawn from the power management device in the corresponding operating state, wherein the optimal operating voltage is the lowest possible voltage provided to the peripheral device in the corresponding operating state that does not cause the peripheral device to stop operating, and wherein said automatically determining the plurality of optimal operating parameters comprises:
for each of a plurality of operating states of the power management device:
determining a first optimal current threshold for a current operating voltage provided to the peripheral device in the corresponding operating state;
lowering the current operating voltage provided to the peripheral device in the corresponding operating state to detect at what voltage level the peripheral device stops operating;
setting the optimal operating voltage of the first operating state based on the voltage level at which the peripheral device stops operating; and
determining a second optimal current threshold for the optimal operating voltage, wherein the plurality of optimal operating parameters comprises the optimal operating voltage and the second optimal current threshold.

16. The computer readable storage medium of claim 15, wherein the method further comprises programming the power management device to operate according to the plurality of optimal operating parameters when in a normal operating mode.

17. The computer readable storage medium of claim 15, wherein determining the first optimal current threshold and the second optimal current threshold each comprises:
setting a current set point to a default value;
performing one or more operations between the host device and the peripheral device to operate the peripheral device in its highest current draw mode that is expected during the corresponding operating state;
measuring the current provided to the peripheral device while performing the one or more operations;
comparing the current and a set current corresponding to the current set point;
if the current provided to the peripheral device is higher than the set current:
increasing the current set point to a higher value than the default value; and
comparing the current provided to the peripheral device and a set current corresponding to the increased current set point; and
if the current provided to the peripheral device is not higher than the set current, setting the current set point as the optimal current threshold.

* * * * *